[12] United States Patent
Kobayashi et al.

(10) Patent No.: US 9,349,539 B2
(45) Date of Patent: May 24, 2016

(54) CERAMIC ELECTRONIC COMPONENT

(71) Applicant: TAIYO YUDEN CO., LTD., Taito-ku, Tokyo (JP)

(72) Inventors: Satoshi Kobayashi, Takasaki (JP); Tomoaki Nakamura, Takasaki (JP); Takahisa Fukuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 287 days.

(21) Appl. No.: 13/949,028

(22) Filed: Jul. 23, 2013

(65) Prior Publication Data
US 2014/0160627 A1 Jun. 12, 2014

(30) Foreign Application Priority Data
Dec. 6, 2012 (JP) ................................ 2012-267020

(51) Int. Cl.
*H01G 4/005* (2006.01)
*H01G 4/228* (2006.01)
*H01G 4/06* (2006.01)
*H01G 4/30* (2006.01)
*H01G 4/232* (2006.01)
*H01G 4/12* (2006.01)

(52) U.S. Cl.
CPC ............... *H01G 4/30* (2013.01); *H01G 4/2325* (2013.01); *H01G 4/12* (2013.01)

(58) Field of Classification Search
CPC ......... H01G 4/30; H01G 4/232; H01G 4/012; H01G 4/1227; H01G 4/228
USPC ..................................... 361/321.1, 306.1, 303
See application file for complete search history.

(56) References Cited

U.S. PATENT DOCUMENTS
2007/0242416 A1* 10/2007 Saito et al. ................. 361/321.1

FOREIGN PATENT DOCUMENTS

| JP | H11-162771 | A |   | 6/1999 |
|----|------------|---|---|--------|
| JP | H11-219849 | A |   | 8/1999 |
| JP | 2003-197460 | A |   | 7/2003 |
| JP | 2003197460 | A | * | 7/2003 |
| JP | 2003-318059 | A |   | 11/2003 |
| JP | 2007-281400 | A |   | 10/2007 |

OTHER PUBLICATIONS

Notice of Reasons for Refusal issued by Japanese Patent Office, mailed Dec. 18, 2013, for Japanese counterpart application No. 2012-267020.

* cited by examiner

*Primary Examiner* — Eric Thomas
*Assistant Examiner* — Arun Ramaswamy
(74) *Attorney, Agent, or Firm* — Law Office of Katsuhiro Arai

(57) ABSTRACT

A ceramic electronic component includes external electrodes having a multi-layer structure including an intermediate conductive resin layer, wherein the intermediate conductive resin layer in the external electrode is made of epoxy resin containing conductive filler, and the intermediate conductive resin layer meets both the condition B/A≤0.47 and condition C/A≥0.39 (A, B and C represent the maximum spectral intensities obtained based on the relationship line of the wave number and spectral intensity of the intermediate conductive resin layer as obtained by the ATR method). The ceramic electronic component minimizes separation that could occur at the interface between such intermediate conductive resin layer and a metal layer.

9 Claims, 2 Drawing Sheets

Figures 1, 2:
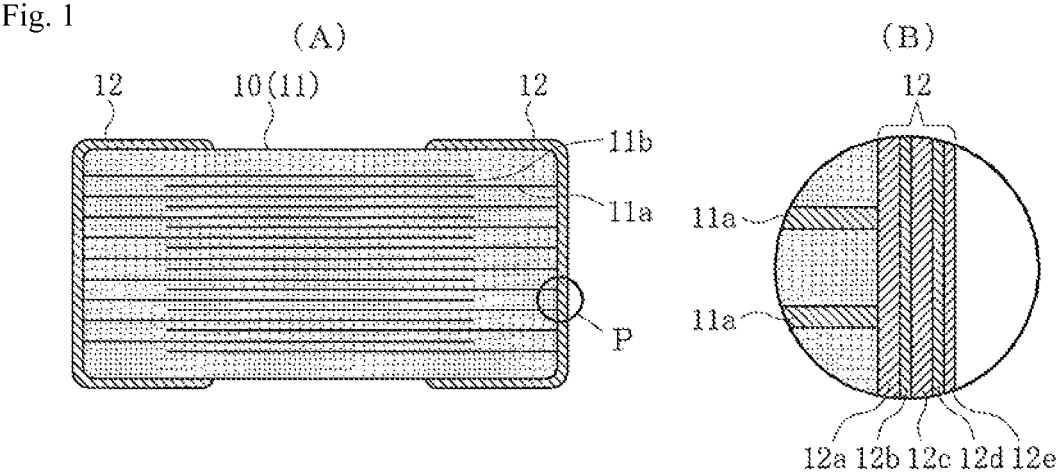

| | Drying (in atmosphere) | | Curing (in atmosphere) | | B/A | C/A | Percent defective in heat |
|---|---|---|---|---|---|---|---|
| | Temperature (°C) | Time (hr) | Temperature (°C) | Time (hr) | | | |
| Sample 1 | 150 | 0.5 | 150 | 0 | 0.38 | 0.39 | 20% |
| Sample 2 | 150 | 0.5 | 150 | 0.5 | 0.36 | 0.43 | 20% |
| Sample 3 | 150 | 0.5 | 150 | 2.0 | 0.34 | 0.44 | 10% |
| Sample 4 | 150 | 0.5 | 155 | 1.0 | 0.34 | 0.48 | 0% |
| Sample 5 | 150 | 0.5 | 155 | 2.0 | 0.44 | 0.46 | 0% |
| Sample 6 | 150 | 0.5 | 156 | 0.5 | 0.43 | 0.63 | 0% |
| Sample 7 | 150 | 0.5 | 157 | 0.5 | 0.47 | 0.60 | 0% |
| Sample 8 | 150 | 0.5 | 160 | 0.5 | 0.59 | 0.63 | 80% |
| Sample 9 | 150 | 0.5 | 160 | 2.0 | 0.58 | 0.67 | 100% |
| Sample 10 | 150 | 0.5 | 180 | 4.0 | 0.58 | 0.65 | 100% |

CERAMIC ELECTRONIC COMPONENT

BACKGROUND

1. Field of the Invention

The present invention relates to a ceramic electronic component such as a multilayer ceramic capacitor.

2. Description of the Related Art

Ceramic electronic components such as multilayer ceramic capacitors have external electrodes to be electrically connected to a pad, etc., on a board using solder, etc. These external electrodes generally have a multi-layer structure where one base metal layer, at least one intermediate metal layer and one surface metal layer are provided in this order.

With the aforementioned ceramic electronic components, the components themselves, which are primarily constituted by ceramics, may crack when an internal force is applied as a result of temperature change at the time of connection or during use, or when an external force is applied at the time of connection or during use, and therefore attempts have been made to replace the intermediate metal layers of their external electrodes with intermediate conductive resin layers made of "synthetic resin containing conductive filler" so as to reduce the aforementioned internal force and external force by means of these intermediate conductive resin layers and thereby eliminate the possibility of cracking as mentioned above (refer to Patent Literature 1 below).

However, replacing the intermediate metal layers of the external electrodes with intermediate conductive resin layers made of "synthetic resin containing conductive filler" can possibly cause separation at the interface between such intermediate conductive resin layer and a metal layer (base metal layer, surface metal layer or another intermediate metal layer) due to the internal force or external force mentioned above.

Background Art Literatures

[Patent Literature 1] Japanese Patent Laid-open No. Hei 11-219849

SUMMARY

An object of the present invention is to provide a ceramic electronic component whose external electrodes have a multi-layer structure including an intermediate conductive resin layer, designed to minimize separation that could occur at the interface between such intermediate conductive resin layer and a metal layer.

To achieve the aforementioned object, the present invention provides a ceramic electronic component having external electrodes of multi-layer structure including an intermediate conductive resin layer made of synthetic resin containing conductive filler, wherein the intermediate conductive resin layer is made of epoxy resin containing conductive filler, and the intermediate conductive resin layer meets both the condition $B/A \leq 0.47$ and condition $C/A \geq 0.39$ in a two-axis graph representing the relationship line of the wave number and spectral intensity of the intermediate conductive resin layer as obtained by the ATR method where: (1) "A" represents the maximum spectral intensity when, given a reference line BLa set by connecting the spectral intensity at wave number 1400 $cm^{-1}$ and spectral intensity at wave number 1560 $cm^{-1}$ along the relationship line, the distance between the intersection point A1 of a detection line DLa drawn in parallel with the spectral intensity axis in the wave number range of 1500±25 $cm^{-1}$ and the relationship line on one hand and the intersection point A2 of the detection line DLa and reference line BLa on the other, as calculated by (Spectral intensity at intersection point A1)−(Spectral intensity at intersection point A2), becomes the maximum; (2) "B" represents the maximum spectral intensity when, given a reference line BLb set by connecting the spectral intensity at wave number 1560 $cm^{-1}$ and spectral intensity at wave number 1800 $cm^{-1}$ along the relationship line, the distance between the intersection point B1 of a detection line DLb drawn in parallel with the spectral intensity axis in the wave number range of 1730±25 $cm^{-1}$ and the relationship line on one hand and the intersection point B2 of the detection line DLb and reference line BLb on the other, as calculated by (Spectral intensity at intersection point B1)−(Spectral intensity at intersection point B2), becomes the maximum; and (3) "C" represents the maximum spectral intensity when, given a reference line BLc set by connecting the spectral intensity at wave number 3075 $cm^{-1}$ and spectral intensity at wave number 3675 $cm^{-1}$ along the relationship line, the distance between the intersection point C1 of a detection line DLc drawn in parallel with the spectral intensity axis in the wave number range of 3300±300 $cm^{-1}$ and the relationship line on one hand and the intersection point C2 of the detection line DLc and reference line BLc on the other, as calculated by (Spectral intensity at intersection point C1)−(Spectral intensity at intersection point C2), becomes the maximum.

According to the present invention, a ceramic electronic component is provided whose external electrodes have a multi-layer structure including an intermediate conductive resin layer, and which is designed to minimize separation that could occur at the interface between such intermediate conductive resin layer and a metal layer.

The aforementioned and other objects of the present invention, as well as the characteristics and effects according to each of these objects, are made clear by the explanation provided below and drawings attached hereto.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS (A) in FIG. 1 is a longitudinal section view of a multilayer ceramic capacitor to which the present invention is applied; (B) in FIG. 1 is an enlarged view of P in (A) in FIG. 1.

FIG. 2 is a table showing the drying conditions, curing conditions, B/A values, C/A values and percent defective in heat resistance of Samples 1 to 10, respectively.

Figure 3:
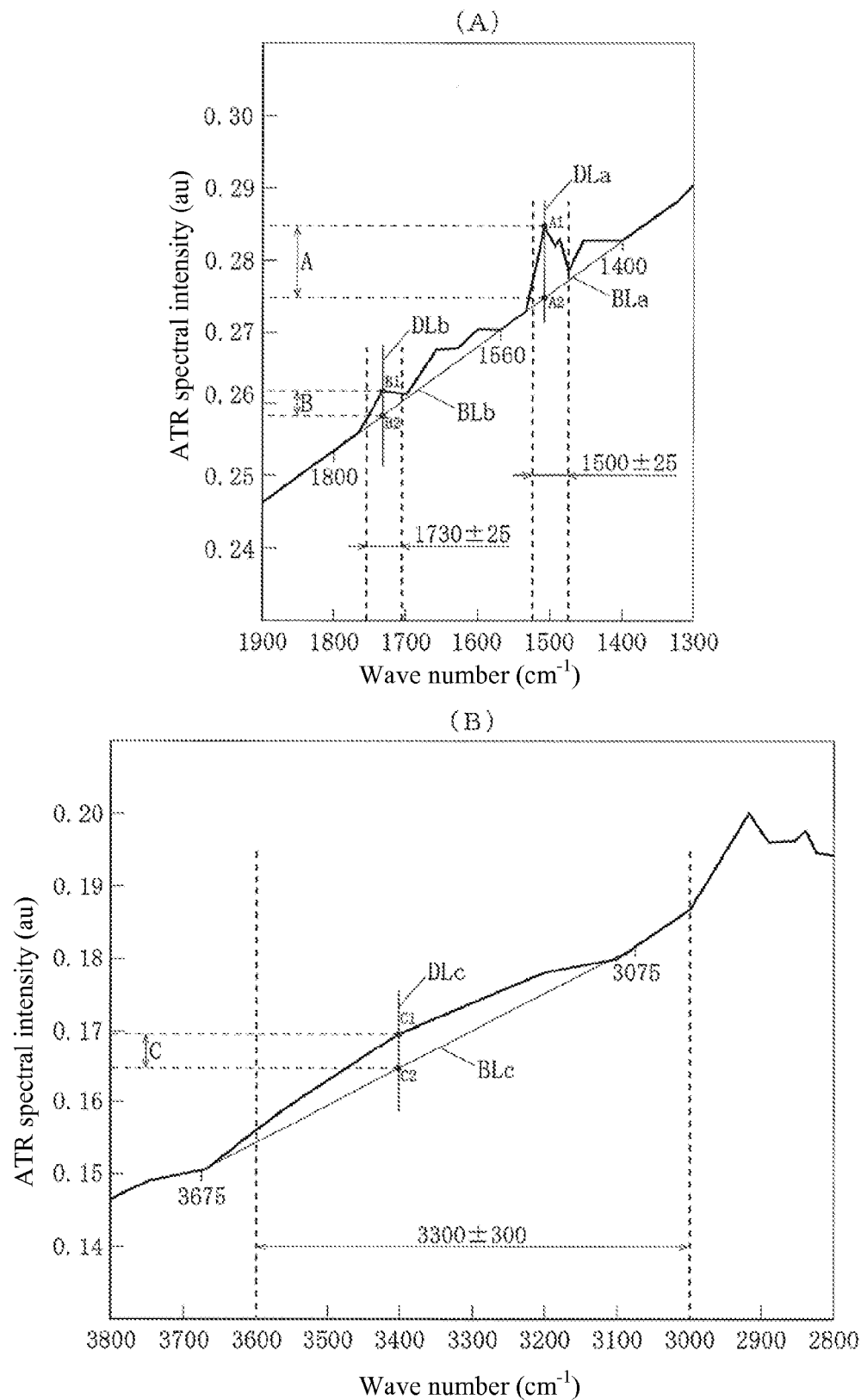

(A) in FIG. 3 and (B) in FIG. 3 are graphs explaining how the maximum spectral intensities A, B and C are determined.

DESCRIPTION OF THE SYMBOLS

10—Multilayer ceramic capacitor
11—Component body

12—External electrode
12a—Base metal layer
12b—First intermediate metal layer
12c—Intermediate conductive resin layer
12d—Second intermediate metal layer
12e—Surface metal layer.

DETAILED DESCRIPTION OF EMBODIMENTS

<<Basic Structure of Multilayer Ceramic Capacitor>>

First, the basic structure of the multilayer ceramic capacitor to which the present invention is applied is explained by citing (A) in FIG. 1 and (B) in FIG. 1.

A multilayer ceramic capacitor 10 is a roughly rectangular solid whose dimensional relationships are characterized by [Length>Width=Height] or [Length>Width>Height] as reference dimensions, where it comprises a component body of roughly rectangular solid shape 11 and a pair of external electrodes 12 provided at both ends of the component body 11 in the length direction. Here, the length corresponds to the dimension in the left/right direction in (A) in FIG. 1, width corresponds to the dimension in the direction from front to back in (A) in FIG. 1, and height corresponds to the dimension in the up/down direction in (A) in FIG. 1.

The component body 11 has a capacity-forming part where many roughly rectangular internal electrode layers 11a are stacked via dielectric layers 11b, and also has a margin part where no internal electrode layer 11a exists on either side in the height direction or in the width direction.

Each internal electrode layer 11a is made of nickel, copper, palladium, platinum, silver, gold, or alloy thereof, for example, and the outline and thickness of each internal electrode layer 11a are roughly the same. Each dielectric layer 11b and margin part are made of barium titanate, strontium titanate, calcium titanate, magnesium titanate, calcium zirconate, calcium titanate zirconate, barium zirconate, or titanium oxide, for example, and the thickness of each dielectric layer 11b is roughly the same.

While the total number of internal electrode layers 11a in an actual multilayer ceramic capacitor 10 meeting the needs for size reduction and capacity increase amounts to 100 or more, the one shown in (A) in FIG. 1 has a total of 18 internal electrode layers 11a, for the sake of convenience of illustration, where the left edge of each odd-numbered internal electrode layer 11a as counted from the top is electrically connected to the left external electrode 12, while the right edge of each even-numbered internal electrode layer 11a as counted from the top is electrically connected to the right external electrode 12.

The pair of external electrodes 12 are each provided in a manner continuously covering an end face of the component body 11 in the length direction and parts of its four sides (two sides in the height direction and two sides in the width direction). Each external electrode 12 has a five-layer structure comprising a base metal layer 12a contacting the component body 11, first intermediate metal layer 12b contacting the surface of the base metal layer 12a, intermediate conductive resin layer 12c contacting the surface of the first intermediate metal layer 12b, second intermediate metal layer 12d contacting the surface of the intermediate conductive resin layer 12c, and surface metal layer 12e contacting the surface of the second intermediate metal layer 12d.

The base metal layer 12a is made of a mixture of nickel, copper, palladium, platinum, silver, gold, or alloy thereof on one hand and a common material component of the same quality as the one constituting the dielectric layer 11b and margin part on the other, or of a mixture of the same metal or alloy and a glass component such as silica, for example. The first intermediate metal layer 12b and second intermediate metal layer 12d are made of nickel, copper, palladium, platinum, silver, gold, or alloy thereof, for example. The surface metal layer 12e is made of tin, palladium, gold, zinc, or alloy thereof, for example.

The intermediate conductive resin layer 12c is made of epoxy resin containing conductive filler, for example, where the conductive filler is constituted by a metal filler made of silver, copper, nickel, or alloy thereof, or by a carbon filler. Representative shapes of the conductive filler include granule, flake, and fiber. Also, preferably the ratio by mass of epoxy resin and conductive filler in the intermediate conductive resin layer 12c is in a range of 9:1 to 6:4.

<<Specific Structures and Manufacturing Methods of Samples 1 to 10>>

Next, the specific structures and manufacturing methods of Samples 1 to 10 shown in FIG. 2 (refer to FIG. 2) are explained. Here, the basic structure of each of Samples 1 to 10 is the same as that of the multilayer ceramic capacitor 10.

Samples 1 to 10 each have a size of 3225 (reference dimensions of length, width and height are 3.2 mm, 2.5 mm and 2.5 mm), 200 internal electrode layers 11a made of nickel, and average thickness of roughly 1.0 μm. The dielectric layer 11b and margin part are made of barium titanate, and the average thickness of the dielectric layer 11b is roughly 10.0 μm.

In addition, the base metal layer 12a of the external electrode 12 is made of a mixture of nickel and common material component (barium titanate) and its thickness is roughly 10.0 μm. The first intermediate metal layer 12b is made of copper and its thickness is roughly 4.0 μm. The intermediate conductive resin layer 12c is made of epoxy resin containing silver filler and its thickness is roughly 30.0 μm, and ratio by mass of epoxy resin and silver filler is roughly 8:2. The second intermediate metal layer 12d is made of nickel and its thickness is roughly 3.0 μm. The surface metal layer 12e is made of tin and its thickness is roughly 5.0 μm.

The component body 11 is produced by applying a slurry containing barium titanate powder, ethanol (solvent), polyvinyl butyral (binder), and additives such as dispersant to a sheet shape and drying the sheet, while printing a paste containing nickel powder, terpineol (solvent), ethyl cellulose (binder), and additives such as dispersant to a roughly rectangular shape and drying the rectangle, and then stacking and pressure-bonding the obtained sheets and rectangles as deemed appropriate, followed by sintering (including binder removal and sintering) in a reducing ambience or ambience of low partial oxygen pressure based on a temperature profile appropriate for barium titanate powder and nickel powder.

The base metal layer 12a of the external electrode 12 is produced by adding barium titanate powder (common material component) to the aforementioned paste, applying the paste on both ends of the unsintered component body 11 in the length direction and then sintering the paste together with the component body, or by applying the paste on both ends of the sintered component body 11 in the length direction and then baking in a reducing ambience or ambience of low partial oxygen pressure. The first intermediate metal layer 12b is produced by putting the component body 11 after production of its base metal layer 12a into a plating bath to apply electroplating. The intermediate conductive resin layer 12c is produced, after the production of the first intermediate metal layer 12b, by applying uncured "epoxy resin containing silver filler" on the surface of the first intermediate metal layer 12b, drying the resin, and then curing the dried resin by heat treatment. The applicable drying conditions (ambience, temperature and time) and curing conditions (ambience, temperature and time) here are as shown under "Drying" and "Curing" in FIG. 2. The second intermediate metal layer 12d is produced by putting the component body 11 after production of its intermediate conductive resin layer 12c into a plating bath to apply electroplating. The surface metal layer 12e is produced by putting the component body 11 after production of its second intermediate metal layer 12d into a plating bath to apply electroplating.

<<How to Determine Maximum Spectral Intensities A, B and C, and Grounds Therefore>>

Next, how to determine the maximum spectral intensities A, B and C used for "B/A" and "C/A" in FIG. 2, and grounds for these methods, are explained by citing (A) in FIG. 3 and (B) in FIG. 3. (A) in FIG. 3 and (B) in FIG. 3 are each a two-axis graph representing the relationship line of the wave number and spectral intensity of the intermediate conductive resin layer 12c of Sample 4 in FIG. 2, along the wave number axis (horizontal axis) and spectral intensity axis (vertical axis), as obtained by the ATR (attenuated total reflection) method.

To determine the maximum spectral intensity A, first a reference line BLa is set that connects the spectral intensity at wave number 1400 cm$^{-1}$ and spectral intensity at wave number 1560 cm$^{-1}$ along the relationship line, as shown in (A) in FIG. 3. Then, (Spectral intensity at intersection point A1)–(Spectral intensity at intersection point A2) is calculated, where the distance between the intersection point A1 of a detection line DLa drawn in parallel with the spectral intensity axis and the relationship line in the wave number range of 1500±25 cm$^{-1}$ on one hand and the intersection point A2 of the detection line DLa and reference line BLa on the other becomes the maximum, as the maximum spectral intensity A.

Also to determine the maximum spectral intensity B, first a reference line BLb is set that connects the spectral intensity at wave number 1560 cm$^{-1}$ and spectral intensity at wave number 1800 cm$^{-1}$ along the relationship line, as shown in (A) in FIG. 3. Then, (Spectral intensity at intersection point B1)–(Spectral intensity at intersection point B2) is calculated, where the distance between the intersection point B1 of a detection line DLb drawn in parallel with the spectral intensity axis and the relationship line in the wave number range of 1730±25 cm$^{-1}$ on one hand and the intersection point B2 of the detection line DLb and reference line BLb on the other becomes the maximum, as the maximum spectral intensity B.

Furthermore, to determine the maximum spectral intensity C, first a reference line BLc is set that connects the spectral intensity at wave number 3075 cm$^{-1}$ and spectral intensity at wave number 3675 cm$^{-1}$ along the relationship line, as shown in (B) in FIG. 3. Then, (Spectral intensity at intersection point C1)–(Spectral intensity at intersection point C2) is calculated, where the distance between the intersection point C1 of a detection line DLc drawn in parallel with the spectral intensity axis and the relationship line in the wave number range of 3300±300 cm$^{-1}$ on one hand and the intersection point C2 of the detection line DLc and reference line BLc on the other becomes the maximum, as the maximum spectral intensity C.

As mentioned earlier, (A) in FIG. 3 and (B) in FIG. 3 each represent the relationship line of the wave number and spectral intensity of the intermediate conductive resin layer 12c of Sample 4 in FIG. 2, and because the maximum spectral intensity A is 0.1, maximum spectral intensity B is 0.034 and maximum spectral intensity C is 0.048 according to the aforementioned determination methods, B/A is calculated as 0.34, while C/A is calculated as 0.48, as shown for Sample 4 in FIG. 2.

The grounds for the determination methods described above are as follows. To be specific, epoxy resin being the primary constituent of the intermediate conductive resin layer 12c has a benzene ring, and the benzene ring manifests as a peak in the wave number range of 1500±25 cm$^{-1}$. In other words, the maximum spectral intensity A represents this peak as captured. On the other hand, part of the epoxy group breaks down and turns into a carbonyl group during the course of curing of epoxy resin, and the carbonyl group manifests as a peak in the wave number range of 1730±25 cm$^{-1}$. In other words, the maximum spectral intensity B represents this peak as captured. Furthermore, the epoxy group undergoes ring-opening to produce an OH group during the course of curing of epoxy resin, and the OH group manifests as a peak in the wave number range of 3300±300 cm$^{-1}$. In other words, the maximum spectral intensity C represents this peak as captured.

In addition, the wave numbers 1400 cm$^{-1}$ and 1560 cm$^{-1}$ used in the setting of reference line BLa correspond to the minimum wave number and maximum wave number of continuous undulations including the intersection point A1, respectively, the wave numbers 1560 cm$^{-1}$ and 1800 cm$^{-1}$ used in the setting of reference line BLb correspond to the minimum wave number and maximum wave number of continuous undulations including the intersection point B1, respectively, and the wave numbers 3075 cm$^{-1}$ and 3675 cm$^{-1}$ used in the setting of reference line BLc correspond to the minimum wave number and maximum wave number of continuous undulations including the intersection point C1, respectively.

The maximum spectral intensity A is based on the aforementioned benzene ring which is thermally stable, and thus remains roughly unchanged regardless of the curing conditions. On the other hand, the maximum spectral intensity B changes with an increase in the aforementioned carbonyl groups, and because this increase in carbonyl groups is considered a cause of heat resistance deterioration of epoxy resin, preferably the value of "Maximum spectral intensity B/Maximum spectral intensity A" ("B/A" in FIG. 2) is as low as possible. Additionally, the maximum spectral intensity C changes with an increase in the aforementioned OH groups, and because this increase in OH groups provides a rough guide for progress of curing of epoxy resin, preferably the value of "Maximum spectral intensity C/Maximum spectral intensity A" ("C/A" in FIG. 2) is as high as possible.

<<How to Measure "B/A" and "C/A" in FIG. 2>>

Next, how to measure "B/A" and "C/A" in FIG. 2 is explained.

First, 10 each of Samples 1 to 10 mentioned above are prepared, which are then cut or polished to expose the section of the intermediate conductive resin layer 12c. Thereafter, an infrared spectrometry imaging system (Vertex 70 manufactured by Bruker Optics) is used to obtain a relationship line of the wave number and spectral intensity of each intermediate conductive resin layer 12c according to the ATR method at a room temperature of approx. 25° C. and a humidity of approx. 50% (refer to (A) in FIG. 3 and (B) in FIG. 3). Next, the maximum spectral intensities A, B and C are obtained for each intermediate conductive resin layer 12c according to the determination methods explained in <<How to Determine Maximum Spectral Intensities A, B and C, and Grounds Therefore>> above. Thereafter, the average of "Maximum spectral intensity B/Maximum spectral intensity A" ("B/A" in FIG. 2) and average of "Maximum spectral intensity C/Maximum spectral intensity A" ("C/A" in FIG. 2) are obtained for each of Samples 1 to 10.

<<How to Measure "Percent Defective in Heat Resistance" in FIG. 2>>

Next, how to measure "Percent defective in heat resistance" in FIG. 2 is explained.

First, 10 each of Samples 1 to 10 mentioned above are prepared, which are then soaked for 3 seconds in a solder bath of 270° C. and removed. Thereafter, the samples are cut or polished to expose the section of each external electrode 12 and an electron microscope is used to observe the section to check for separation, or absence thereof, at the interface between the intermediate conductive resin layer 12c in each external electrode 12 and the metal layer contacting the intermediate conductive resin layer 12c (indicating the first intermediate metal layer 12b or second intermediate metal layer 12d). Then, "Number of samples showing separation/10" ("Percent defective in heat resistance" in FIG. 2) is obtained for each of Samples 1 to 10.

<<Evaluation of Samples 1 to 10>>

As shown in FIG. 2, the "Percent defective in heat resistance" is 0% with samples 4 to 7, while the "B/A" and "C/A" of Samples 4 to 7 are 0.47 or less and 0.46 or more, respectively. As explained at the end of <<How to Determine Maximum Spectral Intensities A, B and C, and Grounds Therefore>> above, preferably the value of "B/A" is as low as possible, while preferably the value of "C/A" is as high as possible, which means that as long as the intermediate conductive resin layer 12c meets both the condition B/A≤0.47 and condition C/A≥0.46, then separation that could otherwise occur at the interface between the intermediate conductive resin layer 12c included in the external electrode 12 and the metal layer contacting the intermediate conductive resin layer 12c (indicating the first intermediate metal layer 12b or second intermediate metal layer 12d) can be suppressed without fail.

Also, as shown in FIG. 2, Samples 1 to 3 have a "Percent defective in heat resistance" of either 20% or 10%, which is clearly lower than the "Percent defective in heat resistance" of Samples 8 to 10, and also because Samples 1 to 3 have a "B/A" of 0.47 or less just like the B/A of Samples 4 to 7, sufficient effect of suppressing separation that could otherwise occur at the interface between the intermediate conductive resin layer 12c included in the external electrode 12 and the metal layer contacting the intermediate conductive resin layer 12c (indicating the first intermediate metal layer 12b or second intermediate metal layer 12d) can be obtained as long as the intermediate conductive resin layer 12c meets both the condition B/A≤0.47 and condition C/A≥0.39.

<<Application to Other Ceramic Electronic Components>>

The aforementioned explanations used an example of the external electrode 12 having a five-layer structure, but effects similar to the foregoing can be obtained with a three-layer structure where the first intermediate metal layer 12b and second intermediate metal layer 12d are eliminated from the external electrode 12, or with a four-layer structure where either the first intermediate metal layer 12b or second intermediate metal layer 12d is eliminated, or with a multi-layer structure where there are six or more layers including more intermediate metal layers, or when metal layers other than the intermediate conductive resin layer 12c are made of a material different from the foregoing, as long as the intermediate conductive resin layer 12c meets the aforementioned conditions relating to maximum spectral intensities. In addition, while the intermediate conductive resin layer 12c is made of epoxy resin containing silver filler in the above example, effects similar to the foregoing can be obtained even when a silver alloy filler, carbon filler, or other conductive filler is used instead of the silver filler, as long as the intermediate conductive resin layer 12c meets the aforementioned conditions relating to maximum spectral intensities.

Furthermore, while the external electrodes 12 are provided on a multilayer ceramic capacitor in the above example, effects similar to the foregoing can be obtained as long as the intermediate conductive resin layer 12c meets the aforementioned conditions relating to maximum spectral intensities, even with a ceramic electronic component other than a multilayer ceramic capacitor, such as a multilayer ceramic inductor, where external electrodes of multi-layer structure provided on it have an intermediate conducive resin layer 12c similar to the foregoing.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-267020, filed Dec. 6, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A ceramic electronic component having external electrodes of multi-layer structure including an intermediate conductive resin layer made of synthetic resin containing conductive filler, wherein:

the intermediate conductive resin layer is made of epoxy resin containing conductive filler; and the intermediate conductive resin layer meets both a condition B/A≤0.47 and a condition C/A≥0.39 in a two-axis graph representing a relationship line of a wave number and spectral intensity of the intermediate conductive resin layer as measured by attenuated total reflectance (ATR) where:

A represents a maximum spectral intensity when, given a reference line BLa set by connecting a spectral intensity at wave number 1400 cm$^{-1}$ and spectral intensity at wave number 1560 cm$^{-1}$ along the relationship line, a distance between an intersection point A1 of a detection line DLa drawn in parallel with a spectral intensity axis in a wave number range of 1500±25 cm$^{-1}$ and the relationship line on one hand and an intersection point A2 of the detection line DLa and reference line BLa on the other, as calculated by (Spectral intensity at intersection point A1)−(Spectral intensity at intersection point A2), becomes a maximum;

B represents a maximum spectral intensity when, given a reference line BLb set by connecting a spectral intensity at wave number 1560 cm$^{-1}$ and spectral intensity at wave number 1800 cm$^{-1}$ along the relationship line, a distance between an intersection point B1 of a detection line DLb drawn in parallel with a spectral intensity axis in a wave number range of 1730±25 cm$^{-1}$ and the relationship line on one hand and an intersection point B2 of the detection line DLb and reference line BLb on the other, as calculated by (Spectral intensity at intersection point B1)−(Spectral intensity at intersection point B2), becomes a maximum; and C represents a maximum spectral intensity when, given a reference line BLc set by connecting a spectral intensity at wave number 3075 cm$^{-1}$ and spectral intensity at wave number 3675 cm$^{-1}$ along the relationship line, a distance between an intersection point C1 of a detection line DLc drawn in parallel with a spectral intensity axis in a wave number range of 3300±300 cm$^{-1}$ and the relationship line on one hand and an intersection point C2 of the detection line DLc and reference line BLc on the other, as calculated by (Spectral intensity at intersection point C1)−(Spectral intensity at intersection point C2), becomes a maximum.

2. A ceramic electronic component according to claim 1, wherein the condition C/A≥0.39 satisfies C/A≥0.46.

3. A ceramic electronic component according to claim 1, wherein the external electrode has a five-layer structure comprising a base metal layer containing nickel, a first intermediate metal layer made of copper, the intermediate conductive resin layer, a second intermediate metal layer made of nickel, and a surface metal layer made of tin, in this order.

4. A ceramic electronic component according to claim 2, wherein the external electrode has a five-layer structure comprising a base metal layer containing nickel, a first intermediate metal layer made of copper, the intermediate conductive resin layer, a second intermediate metal layer made of nickel, and a surface metal layer made of tin, in this order.

5. A ceramic electronic component according to claim 1, characterized in that the conductive filler is a silver filler.

6. A ceramic electronic component according to claim 2, characterized in that the conductive filler is a silver filler.

7. A ceramic electronic component according to claim 3, characterized in that the conductive filler is a silver filler.

8. A ceramic electronic component according to claim 4, characterized in that the conductive filler is a silver filler.

9. A ceramic electronic component according to claim 1, wherein the intermediate conductive resin layer meets a condition C/A>0.44.

* * * * *

UNITED STATES PATENT AND TRADEMARK OFFICE
CERTIFICATE OF CORRECTION

PATENT NO. : 9,349,539 B2  
APPLICATION NO. : 13/949028  
DATED : May 24, 2016  
INVENTOR(S) : Satoshi Kobayashi et al.

Page 1 of 1

It is certified that error appears in the above-identified patent and that said Letters Patent is hereby corrected as shown below:

In the Claims

At column 9, line 6, in Claim 1, please delete "1730±25 $cm^{31\ 1}$" and insert therefor --1730±25 $cm^{-1}$--.

At column 9, line 14, in Claim 1, please delete "3075 $cm^{31\ 1}$" and insert therefor --3075 $cm^{-1}$--.

At column 9, line 15, in Claim 1, please delete "3675 $cm^{31\ 1}$" and insert therefor --3675 $cm^{-1}$--.

At column 9, line 19, in Claim 1, please delete "3300±300 $cm^{31\ 1}$" and insert therefor --3300±300 $cm^{-1}$--.

Signed and Sealed this  
Sixteenth Day of August, 2016

Michelle K. Lee  
*Director of the United States Patent and Trademark Office*